(12) United States Patent
Restrepo et al.

(10) Patent No.: US 7,441,173 B2
(45) Date of Patent: Oct. 21, 2008

(54) SYSTEMS, DEVICES, AND METHODS FOR ARC FAULT DETECTION

(75) Inventors: Carlos Restrepo, Atlanta, GA (US); Bin Zhang, Alpharetta, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 338 days.

(21) Appl. No.: 11/355,676

(22) Filed: Feb. 16, 2006

(65) Prior Publication Data

US 2007/0208981 A1 Sep. 6, 2007

(51) Int. Cl.
*G01R 31/30* (2006.01)

(52) U.S. Cl. .............................. 714/745; 714/47; 361/2; 361/103

(58) Field of Classification Search .................... 361/96, 361/45, 54, 42, 2, 103; 700/293; 324/521; 714/745, 47
See application file for complete search history.

(56) References Cited

U.S. PATENT DOCUMENTS

| | | | |
|---|---|---|---|
| 3,817,453 A | 6/1974 | Pinckaers | |
| 4,264,960 A | 4/1981 | Gurr | |
| 4,347,575 A | 8/1982 | Gurr | |
| 4,348,668 A | 9/1982 | Gurr | |
| 4,419,665 A | 12/1983 | Gurr | |
| 4,419,666 A | 12/1983 | Gurr | |
| 4,419,667 A | 12/1983 | Gurr | |
| 4,631,625 A | 12/1986 | Alexander | |
| 4,996,646 A | 2/1991 | Farrington | |
| 5,042,307 A | 8/1991 | Kato | |
| 5,159,519 A | 10/1992 | Cassidy | |
| 5,166,887 A | 11/1992 | Farrington | |
| 5,170,360 A | 12/1992 | Porter | |
| 5,172,329 A | 12/1992 | Rahman | |
| 5,185,705 A | 2/1993 | Farrington | |
| 5,307,230 A * | 4/1994 | MacKenzie | .................. 361/96 |
| 5,325,315 A | 6/1994 | Engel | |
| 5,361,637 A | 11/1994 | Judd | |
| 5,420,740 A | 5/1995 | MacKenzie | |
| 5,432,455 A | 7/1995 | Blades | |
| 5,434,509 A | 7/1995 | Blades | |
| 5,459,630 A | 10/1995 | MacKenzie | |
| 5,475,371 A | 12/1995 | Dunk | |
| 5,483,211 A | 1/1996 | Carrodus | |
| 5,510,945 A | 4/1996 | Taylor | |
| 5,629,869 A | 5/1997 | Johnson | |
| 5,636,134 A | 6/1997 | Johnson | |
| 5,638,296 A | 6/1997 | Johnson | |
| 5,691,869 A | 11/1997 | Engel | |
| 5,744,939 A | 4/1998 | Leppo | |
| 5,796,636 A | 8/1998 | Andrews | |
| 5,805,397 A | 9/1998 | MacKenzie | |

(Continued)

FOREIGN PATENT DOCUMENTS

EP 1322016 6/2003

(Continued)

*Primary Examiner*—David Ton

(57) ABSTRACT

Certain exemplary embodiments comprise a system that comprises an application specific integrated circuit configured to provide an output signal. The output signal can be configured to trip a device in an electrical circuit responsive to a detected fault. The application specific integrated circuit can comprise a temperature sensor. The application specific integrated circuit can be configured to correct at least one measured electrical value responsive to a temperature measured by the temperature sensor.

23 Claims, 5 Drawing Sheets

U.S. PATENT DOCUMENTS

| | | | | |
|---|---|---|---|---|
| 5,815,352 | A | 9/1998 | MacKenzie | |
| 5,818,237 | A | 10/1998 | Zuercher | |
| 5,835,321 | A | 11/1998 | Elms | |
| 5,839,092 | A | 11/1998 | Erger | |
| 5,896,262 | A | 4/1999 | Rae | |
| 5,929,145 | A | 7/1999 | Higgins | |
| 5,933,305 | A | 8/1999 | Schmalz | |
| 5,940,256 | A | 8/1999 | MacKenzie | |
| 5,963,405 | A | 10/1999 | Engel | |
| 5,963,406 | A | 10/1999 | Neiger | |
| 5,969,920 | A | 10/1999 | MacKenzie | |
| 5,999,384 | A | 12/1999 | Chen | |
| 6,031,699 | A | 2/2000 | Dollar | |
| 6,052,046 | A | 4/2000 | Ennis | |
| 6,084,756 | A * | 7/2000 | Doring et al. | 361/45 |
| 6,088,205 | A | 7/2000 | Neiger | |
| 6,128,169 | A | 10/2000 | Neiger | |
| 6,191,589 | B1 | 2/2001 | Clunn | |
| 6,218,844 | B1 | 4/2001 | Wong | |
| 6,259,340 | B1 | 7/2001 | Fuhr | |
| 6,259,996 | B1 | 7/2001 | Haun | |
| 6,262,871 | B1 | 7/2001 | Nemir | |
| 6,266,219 | B1 | 7/2001 | Macbeth | |
| 6,289,267 | B1 | 9/2001 | Alexander | |
| 6,292,717 | B1 | 9/2001 | Alexander | |
| 6,339,525 | B1 | 1/2002 | Neiger | |
| 6,356,426 | B1 | 3/2002 | Dougherty | |
| 6,362,628 | B2 | 3/2002 | Macbeth | |
| 6,370,001 | B1 | 4/2002 | Macbeth | |
| 6,377,427 | B1 | 4/2002 | Haun | |
| 6,407,893 | B1 | 6/2002 | Neiger | |
| 6,414,829 | B1 | 7/2002 | Haun | |
| 6,417,671 | B1 | 7/2002 | Tiemann | |
| 6,421,214 | B1 | 7/2002 | Packard | |
| 6,426,632 | B1 | 7/2002 | Clunn | |
| 6,426,634 | B1 | 7/2002 | Clunn | |
| 6,433,978 | B1 | 8/2002 | Neiger | |
| 6,456,471 | B1 | 9/2002 | Haun | |
| 6,459,273 | B1 | 10/2002 | Dollar | |
| 6,466,029 | B2 | 10/2002 | Stroth | |
| 6,477,021 | B1 | 11/2002 | Haun | |
| 6,487,057 | B1 | 11/2002 | Natili | |
| 6,496,342 | B1 | 12/2002 | Horvath | |
| 6,504,692 | B1 | 1/2003 | Macbeth | |
| 6,522,510 | B1 | 2/2003 | Finlay | |
| 6,525,918 | B1 | 2/2003 | Alles | |
| 6,532,139 | B2 | 3/2003 | Kim | |
| 6,532,140 | B1 * | 3/2003 | McMahon et al. | 361/54 |
| 6,532,424 | B1 | 3/2003 | Haun | |
| 6,542,056 | B2 | 4/2003 | Nerstrom | |
| 6,556,397 | B2 | 4/2003 | Kim | |
| 6,567,250 | B1 | 5/2003 | Haun | |
| 6,577,478 | B2 | 6/2003 | Kim | |
| 6,577,484 | B1 | 6/2003 | Macbeth | |
| 6,590,754 | B1 | 7/2003 | Macbeth | |
| 6,608,741 | B1 | 8/2003 | Macbeth | |
| 6,621,388 | B1 | 9/2003 | Macbeth | |
| 6,621,669 | B1 | 9/2003 | Haun | |
| 6,625,550 | B1 | 9/2003 | Scott | |
| 6,628,486 | B1 | 9/2003 | Macbeth | |
| 6,628,487 | B1 | 9/2003 | Macbeth | |
| 6,633,467 | B2 | 10/2003 | Macbeth | |
| 6,633,824 | B2 | 10/2003 | Dollar | |
| 6,639,768 | B2 | 10/2003 | Zuercher | |
| 6,639,769 | B2 | 10/2003 | Neiger | |
| 6,654,219 | B1 | 11/2003 | Romano | |
| 6,657,837 | B1 | 12/2003 | Morris | |
| 6,667,691 | B2 | 12/2003 | Sapir | |
| 6,671,148 | B2 | 12/2003 | Evans | |
| 6,671,150 | B2 | 12/2003 | Elms | |
| 6,678,137 | B1 | 1/2004 | Mason | |
| 6,707,651 | B2 | 3/2004 | Elms | |
| 6,731,483 | B2 | 5/2004 | Mason | |
| 6,734,682 | B2 | 5/2004 | Tallman | |
| 6,812,677 | B2 | 11/2004 | Walters | |
| 6,813,131 | B2 | 11/2004 | Schmalz | |
| 6,856,498 | B1 | 2/2005 | Finlay | |
| 6,992,872 | B2 | 1/2006 | Morris | |
| 7,023,196 | B2 * | 4/2006 | Khan et al. | 324/521 |
| 7,035,066 | B2 * | 4/2006 | McMahon et al. | 361/42 |
| 7,110,864 | B2 * | 9/2006 | Restrepo et al. | 700/293 |
| 7,307,820 | B2 * | 12/2007 | Henson et al. | 361/42 |
| 7,359,168 | B2 * | 4/2008 | Elms et al. | 361/42 |
| 2002/0012210 | A1 | 1/2002 | Morris | |
| 2002/0032535 | A1 | 3/2002 | Alexander | |
| 2002/0033701 | A1 | 3/2002 | Macbeth | |
| 2002/0075613 | A1 | 6/2002 | Mason | |
| 2002/0097095 | A1 | 7/2002 | Jeon | |
| 2003/0067725 | A1 | 4/2003 | Horvath | |
| 2003/0072113 | A1 | 4/2003 | Wong | |
| 2004/0070495 | A1 | 4/2004 | Chu | |
| 2004/0070898 | A1 * | 4/2004 | McMahon et al. | 361/42 |
| 2005/0203672 | A1 * | 9/2005 | Restrepo et al. | 700/293 |
| 2006/0274460 | A1 | 12/2006 | Zuercher | |
| 2007/0014060 | A1 | 1/2007 | Land | |
| 2007/0081281 | A1 | 4/2007 | Hamer | |

FOREIGN PATENT DOCUMENTS

| EP | 1429437 | 6/2004 |
|---|---|---|

* cited by examiner

SYSTEMS, DEVICES, AND METHODS FOR ARC FAULT DETECTION

BACKGROUND

U.S. Pat. No. 6,459,273 (Dollar), which is incorporated by reference herein in its entirety, allegedly recites a "sputtering arc fault detector (10) for a system having an electrical conductor (14) carrying current to a load. The sputtering arc fault detector includes a current monitor (64) coupled to the conductor for generating a variable signal responsive to behavior of the current in the conductor. A level detector (58) is coupled to the monitor and generates a first pulse when the variable signal exceeds a first level. A step detector (62) is coupled to the monitor and is responsive to rapid step increases of the variable signal. The step detector generates a second pulse when the variable signal exceeds a second level. An arc verifier (48), which is coupled to the level detector and the step detector, combines the first and second pulses, and generates a fault signal when the combined pulses exceed a third level." See Abstract.

U.S. Pat. No. 6,707,651 (Elms), which is incorporated by reference herein in its entirety, allegedly recites a "trip signal generator for an arc fault or ground fault trip unit includes two inputs electrically interconnected with the two outputs of arc fault and ground fault detection circuits. A second input is electrically interconnected with an anode of a semiconductor switching device, such as a triac or SCR, which drives a trip coil of a trip solenoid. A circuit monitors the outputs of a power supply and provides an output when the outputs of the power supply are operational. A trip logic circuit drives a gate of the semiconductor switching device when the outputs of the power supply are operational, when one of the two first inputs is active, and when the second input is inactive." See Abstract.

SUMMARY

Certain exemplary embodiments comprise a system that comprises an application specific integrated circuit configured to provide an output signal. The output signal can be configured to trip a device in an electrical circuit responsive to a detected fault. The application specific integrated circuit can comprise a temperature sensor. The application specific integrated circuit can be configured to correct at least one measured electrical value responsive to a temperature measured by the temperature sensor.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DEFINITIONS

Figure 1:
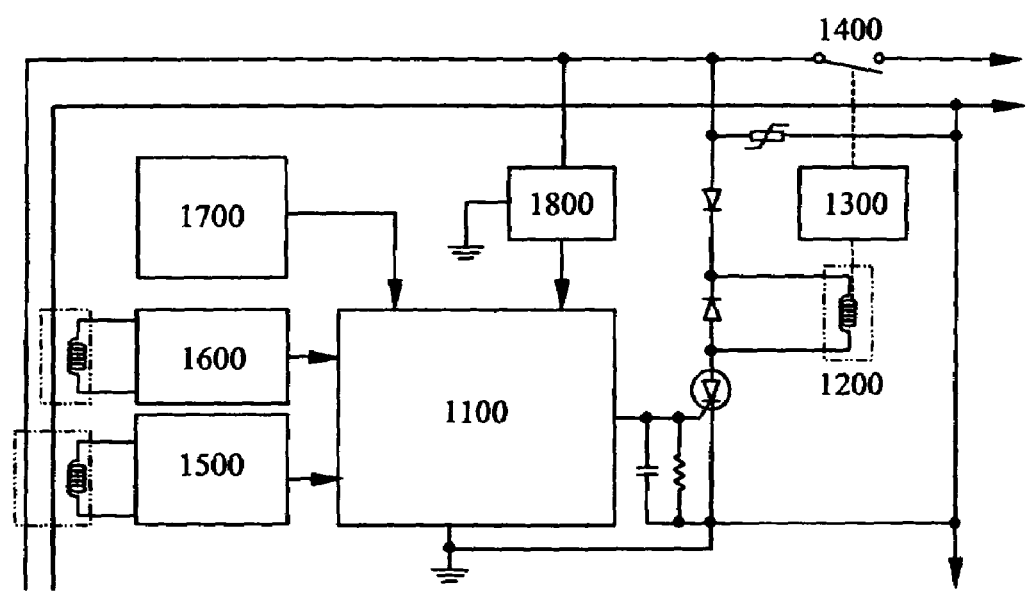
FIG. 1 is a block diagram of an exemplary embodiment of a system 1000.

When the following terms are used substantively herein, the accompanying definitions apply:

a—at least one.
action—to perform an activity.
activity—an action, act, step, and/or process or portion thereof.
adapted to—made suitable or fit for a specific use or situation.
adapter—a device used to effect operative compatibility between different parts of one or more pieces of an apparatus or system.
alternating current—an electric current that reverses direction in a circuit at regular intervals.
amplitude—a magnitude of a variable.
and/or—either in conjunction with or in alternative to.
apparatus—an appliance or device for a particular purpose.
application specific integrated circuit—a set of electronic components and their interconnections that are etched or imprinted on a chip designed to perform a particular function.
approximately—nearly the same as.
arc fault—a discharge of electricity between two or more conductors, the discharge associated with at least a predetermined voltage, current, and/or power level.
associated with—related to.
automatically—acting or operating in a manner essentially independent of external influence or control. For example, an automatic light switch can turn on upon "seeing" a person in its view, without the person manually operating the light switch.
avoid—to resist or try to prevent from happening.
calculate—to compute.
can—is capable of, in at least some embodiments.
caused by—resulting from.
circuit—an electrically conducting pathway.
circuit breaker—a device adapted to automatically open an alternating current electrical circuit.
compare—to examine in order to note the similarities or differences of.
comprising—including but not limited to.
configured to—capable of performing a particular function.
connect—to join or fasten together.
control—to exercise authoritative and/or dominating influence over; direct; adjust to a requirement; and/or regulate.
correct—to change to a more desired value.
coupleable—capable of being joined, connected, and/or linked together.
coupling—linking in some fashion.
data—distinct pieces of information, usually formatted in a special or predetermined way and/or organized to express concepts.
define—to establish the outline, form, or structure of.
detect—to sense, perceive, and/or identify.
device—a machine, manufacture, and/or collection thereof.
differential current—a difference between a first flow of electrical charge involving a first electrical conductor and second flow of electrical charge involving a second electrical conductor.
duration—a measure of a time period over which something occurs and/or exists.
electrical—pertaining to electricity.
energy—usable power.

fault—an arc fault or a ground fault.
frequency—the number of times a specified periodic phenomenon occurs within a specified interval.
gain—an increase or decrease in signal power, voltage, and/or current, expressed as the ratio of output to input.
ground fault—a shorting of an electrical device or circuit to ground.
haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.
indicative—serving to indicate.
information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.
input—related to electricity entering a device.
input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.
install—to connect or set in position and prepare for use.
integrate—to determine a sum.
level and timing control circuit—one or more electrically coupled components configured to determine if an amplitude of a signal exceeds a first predetermined threshold and a duration of the signal exceeds a second predetermined threshold.
machine instructions—directions adapted to cause a machine, such as an information device, to perform a particular operation or function.
machine readable medium—a physical structure from which a machine can obtain data and/or information. Examples include a memory, punch cards, etc.
manage—to direct or control.
may—is allowed and/or permitted to, in at least some embodiments.
measure—to determine a value of something relative to a standard.
mechanism—one or more components configured to perform a function.
memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.
method—a process, procedure, and/or collection of related activities for accomplishing something.
neutral current—a flow of an electrical charge on a common current carrying conductor in an electrical distribution system.
neutral line current sensor—a device or system configured to measure a neutral current.
noise—a random and/or periodic non-data signal.
nuisance trip—an unnecessary trip.
obtain—to receive, calculate, determine, and/or compute.
on-chip linear temperature sensor—a device or system resident on an integrated circuit that is configured to provide a value indicative of temperature, the value varying approximately linearly with temperature.
oscillator circuit—one or more electrically coupled components configured to control a waveform frequency.
output—something produced, and/or generated.
output circuit—one or more electrically coupled components configured to provide a trip signal to a device comprised in an electrical circuit.
phase-shift—(v.) to change a phase of a waveform.
plurality—the state of being plural and/or more than one.
power supply—one or more electrically coupled components configured to provide electrical energy to a device or system.
power up—related to initiating a flow of an electrical charge in an electrical circuit.
power up reset circuit—one or more electrically coupled components configured to avoid a trip during a power up by resetting a system or value that might otherwise provide a trip signal.
predetermined—established in advance.
prevent—to keep an event from happening.
processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

produce—to manufacture or make.

provide—to furnish and/or supply.

rapid—relatively fast, in a time less than approximately 20 milliseconds seconds.

react—respond to an impetus.

receive—to take, get, acquire, and/or have bestowed upon.

relative—in comparison with.

render—make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

responsive—reacting to an influence and/or impetus.

sensor—a device or system adapted to detect or perceive automatically.

set—a related plurality.

signal—detectable transmitted energy, such as an impulse or a fluctuating electric quantity, such as voltage, current, or electric field strength.

silicon-controlled rectifier—a three terminal active device that acts as a gated diode.

simulate—to create as a representation or model of another thing.

simulation circuit—one or more electrically coupled components configured to generate a waveform similar to a waveform indicative of an arc fault or ground fault.

status—information relating to a descriptive characteristic of a device and or system (e.g. on, off, in fault, etc.).

store—to place, hold, and/or retain data, typically in a memory.

strong—characterized by a measured current amplitude of greater than approximately 250 amps.

substantially—to a great extent or degree.

support—to bear the weight of, especially from below.

system—a collection of mechanisms, devices, data, and/or instructions, the collection designed to perform one or more specific functions.

temperature—measure of the average kinetic energy of the molecules in a sample of matter, expressed in terms of units or degrees designated on a standard scale.

threshold—a point that when exceeded produces a given effect or result.

time delay—a time interval between a cause and a result of the cause.

trip—to open an electrical circuit; to automatically interrupt current flow in an electrical circuit.

user—any person, process, device, program, protocol, and/or system that uses a device.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

voltage—a difference in electrical potential between any two conductors of an electrical circuit.

voltage regulator—a device used to control a voltage amplitude in an electrical circuit.

wave—a disturbance, variation, and/or incident that causes the transfer electrical energy progressively from point to point in a medium.

waveform—a profile, graph, and/or visual model of variations of voltage and/or current over time.

DETAILED DESCRIPTION

Certain exemplary embodiments comprise a system that comprises an application specific integrated circuit (ASIC) configured to provide an output signal. The output signal can be configured to trip a device in an electrical circuit responsive to a detected fault. The application specific integrated circuit can comprise a temperature sensor. The application specific integrated circuit can be configured to correct at least one measured electrical value responsive to a temperature measured by the temperature sensor.

Certain exemplary embodiments comprise a circuit for an arc fault and/or ground fault circuit interrupt. The circuit can comprise a specifically designed ASIC component, which can receive and process signals from arc fault and/or ground fault sensors, identify an occurrence of a fault, and/or send an output signal to trip a circuit if a fault is occurring, etc. A system based on this ASIC can be relatively simple architecturally. Performance of this circuit can be enhanced with features such as a power up reset, level and timing control, large signal event with time duration check, accurate on-chip voltage regulation, and/or temperature compensation function that can correct one or more sensor readings and/or fault thresholds, etc.

Certain exemplary embodiments comprise a power up reset function, which can be configured to avoid nuisance trips during a system power up. The power up reset function can be configured to disregard one or more sensor readings and/or calculations that might be indicative of a fault for a predetermined time period during a system start up. An on-chip temperature sensor can compensate for temperature caused variation for one or more measured electrical values and/or a threshold limit associated with a fault input circuit. Since a sensor used for fault detection in certain embodiments can provide a signal that varies linearly with temperature and a signal conditioning circuit from a fault detection sensor to the arc detector can also vary linearly with temperature, a linear type of on-chipk temperature sensor can be used to relatively adjust sensed values and/or threshold levels for fault detection.

A level and timing control circuit can be configured to attempt to avoid unnecessary nuisance trips under different application or noise conditions. The level and timing control circuit can utilize a combined level and signal duration time check to attempt to avoid nuisance trips.

A large signal event control circuit can be configured to allow certain exemplary embodiments to react relatively rapidly for strong arc faults and/or ground faults. When an arc fault and/or ground fault signal level increases, a risk of fire or life threatening arcing can increase. Effective and relatively rapid tripping can be desirable in this type of situation.

An on chip voltage regulator can provide a voltage output for a relatively simple power supply design. Optimal and accurate design inside an ASIC can reduce and/or eliminate a laser trimming process for resistors comprised in an exemplary system.

FIG. 1 is a block diagram of an exemplary embodiment of a system 1000, which can comprise an arc fault and/or ground fault detector comprised in an ASIC 1100. A current sensor 1600 used on a neutral conductor can be configured for use in arc fault monitoring. A differential current sensor 1500 used on both a neutral conductor and a line conductor can be configured for use in ground fault monitoring. Input signals from current sensor 1600 and/or differential current sensor 1500 can be provided to ASIC 1100. In certain exemplary embodiments, ASIC 1100 can be configured to condition a signal, amplify a signal, detect an arc fault, detect a ground fault, regulate a voltage, test one or more components in system 1000 responsive to a signal from a pushable test switch, reset a fault detection counter during power up, compensate for a temperature variation of current sensor 1600 and/or differential current sensor 1500, and/or control circuit breaker trip functions, etc. A set of components 1700, such as resistors and capacitors, in a circuit with the ASIC can be used to control and adjust level or timing parameters. Power consumption in system 1000 can be relatively low. System 1000 can comprise a DC power supply 1800 (isolated or non-isolated) with a voltage output (such as between approximately 10 volts and approximately 15 volts) and can be configured to provide less than approximately 15 milliamps DC current capacity. ASIC 1100 can be configured to generate a tripping control signal if an arc fault or ground fault is detected, which can drive a solenoid 1200, which can actuate a mechanical tripping mechanism 1300 to disconnect power to a connected load (not illustrated) via opening a switch 1400.

Figure 2:
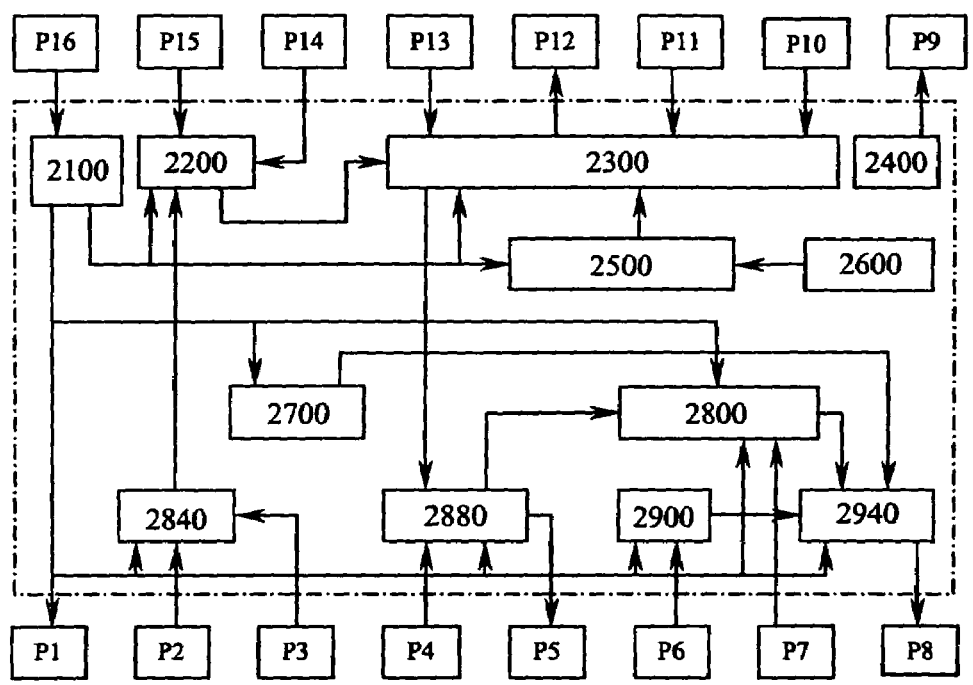
FIG. 2 is a block diagram of an exemplary embodiment of an application specific integrated circuit (ASIC) 2000.

FIG. 2 is a block diagram of an exemplary embodiment of an ASIC 2000, which can be configured to provide an output signal. The output signal can be configured to trip a device in an electrical circuit responsive to a detected fault. ASIC 2000 can comprise any appropriate number of pins, such as for example, 12, 14, 16, 18, 19, 20, and/or 24 pins, etc. Pins can be sequentially numbered, such as from P1 to P16. For certain exemplary embodiments involving a 16 pin configuration, pin and/or circuit assignments and descriptions can be:

P1 (REG): on-chip voltage regulator output (such as +5V DC) pin and/or circuit, which can receive an electrical current from an on-chip voltage regulator 2100. On-chip voltage regulator 2100 can be a relatively accurate DC voltage source for an arc fault signal conditioning circuit 2200 internal to ASIC 2000 and/or a second circuit external (not illustrated) to ASIC 2000 via P1. On-chip voltage regulator 2100 can provide energy for chip testing purposes.

P2 (PTT): a push to test input pin and/or circuit, which can be an input for a normally opened switch input signal. A switch ON can generate a simulated arc signal to an input stage of an arc fault detecting circuit. If a tested component works normally, a tripping output signal can be generated on a pin, P8 (SCR), to disconnect a flow of electrical energy to an electrical system and/or a load electrically coupled thereto. This pin can also be used for component or product testing purpose.

P3 (OSC): an oscillator control input pin and/or circuit, which can be configured to control a simulated waveform frequency used for the push to test circuit. Pin P3 can be electrically coupled to a capacitor, which can affect a waveform frequency and can be checked through an "AFOUT" pin.

P4 (GFINPUT): a ground fault input pin and/or circuit, which can be for an input signal from a differential current sensor.

P5 (GFOUT): a ground fault output signal output pin and/or circuit, which can be used to adjust gain for a ground fault input signal amplify circuit inside ASIC 2000. In certain exemplary embodiments, a signal might not be provided to P5 for a fixed gain inside ASIC 2000. Pin P5 can also be used for signal testing purposes.

P6 (POR): a power up reset input pin and/or circuit, which can be used to adjust or set a power up delay time usually ranges from a few milliseconds to approximately 100 milliseconds.

P7 (GFDLY): a time delay input pin and/or circuit, which can be used to set or adjust a time delay for signal from the ground fault detection circuit. This delay can be configured to avoid nuisance and/or noise caused trips P8 (SCR): a silicon-controlled rectifier (SCR) control output pin and/or circuit, which can be used to control a status of an SCR. When a signal on pin P8 is high, the SCR can be turned on and the tripping mechanism can be activated by an action of a solenoid.

P9 (GND): a ground pin and/or circuit of ASIC 2000.

P10 (AFINT): an arc fault integration signal control or adjustment input pin and/or circuit.

P11 (AFPHSHIFT): an arc fault signal phase shift input pin and/or circuit, which can be used to synchronize signals inside of ASIC 2000 for arc fault detection.

P12 (AFOUT): an arc fault output pin and/or circuit, which can be used to adjust gain for an arc fault input signal amplify circuit inside of ASIC 2000. Certain exemplary embodiments might not provide a signal to this pin for a fixed gain inside of ASIC 2000. In certain exemplary embodiments, this pin can be used for signal testing purpose.

P13 (AFINTISET): arc fault integration current control or set input pin and/or circuit, which can be used to set or adjust a signal level. The signal level can affect a sensitivity of a connected circuit to an arc fault signal.

P14 (AFINPUT): arc fault input pin and/or circuit, which can receive an input signal from a current sensor for a neutral conductor.

P15 (NEUT): an input pin for an arc fault input pin and/or circuit, which can be a ground end of a current sensor for a neutral conductor.

P16 (VDD): a direct current (DC) voltage input pin and/or circuit, which can receive a voltage between approximately 10 volts and approximately 15 volts.

Pins comprised in ASIC 2000 can be in any physical or logical ordering or arrangement. The embodiment described in paragraphs [124] through [139] is intended to be illustrative and not limiting in nature.

Each pin associated with ASIC 2000 can be electrically coupled to a corresponding circuit configured to transfer and/or process a signal associated with each respective pin. For example, ASIC 2000 can comprise:

a power up reset circuit configured to avoid nuisance trips during a system power up;

a circuit configured to receive an input for a ground fault;

a circuit configured to control a gain of a circuit configured to receive a ground fault input signal;

a circuit configured to control a time delay associated with a ground fault input signal;

a circuit configured to control a status of a silicon-controlled rectifier;

a circuit configured to control an arc fault integration;

a circuit configured to phase-shift an arc fault signal;

a circuit configured to control a gain of a circuit configured to receive an input for an arc fault;

a circuit configured to control an arc fault signal amplitude;

a circuit configured to receive an input from a neutral line current sensor; and/or a circuit configured to receive an arc fault input signal, etc.

ASIC 2000 can comprise a voltage regulator 2100, which can be configured to provide a relatively constant voltage to one or more circuits and/or sub-circuits internal to and/or external to ASIC 2000. The voltage provided by voltage regulator 2100 can be a direct current voltage, such as 20, 18.2, 15, 12.1, 10, 8.4, 6, 5, 4.2, 3.1, 1.8, 1.5 volts, and/or any value and/or subrange therebetween.

ASIC 2000 can comprise a PTT signal generator 2840, which can be a waveform generator circuit. PTT signal generator 2840 can be a simulation circuit configured to simulate a signal indicative of an arc fault to an input of ASIC 2000. An output frequency of push to test (PTT) signal generator 2840 can be controlled and/or set by a capacitor tied onto, for example, P3 and a signal can be enabled and /or sent to an input end of arc fault signal conditioning circuit 2200 if a high to low signal changed is sensed from, for example, P2. PTT signal generator 2840 can comprise a simulation circuit configured to simulate a signal indicative of an arc fault to an input of ASIC 2000. The signal can be generated responsive to an action of a user, such as pushing a button to provide an input to pin, for example, P2. PTT signal generator 2840 can comprise an oscillator circuit configured to control a simulated waveform frequency of a simulation circuit.

Arc fault signal conditioning circuit 2200 can receive inputs from a current sensor configured to obtain a signal based upon electrical current flowing over a neutral conductor through, for example, P14 and P15, and also PTT signal generator 2840. The inputs can be adjusted to a desired level and can represent a true arc signal. The inputs can be sent from arc fault signal conditioning circuit 2200 to an arc fault detecting circuit 2300 for event analysis.

ASIC 2000 can comprise a temperature sensor 2600, which can be an on-chip sensor. Temperature sensor 2600 can provide a temperature signal that varies linearly with temperature. A temperature signal from temperature sensor 2600 can be used for correcting, via temperature compensation, one or more signals and/or threshold values.

ASIC 2000 can comprise a threshold level control for arc events 2500, which can receive an input signal from temperature sensor 2600. Threshold level control for arc events 2500 can adjust threshold levels for arc fault detecting circuit 2300, thereby compensating for a temperature change caused variation of an input signal from a current sensor electrically coupled to, for example, P4 and/or P14.

Arc fault detecting circuit 2300 can be configured to identify if an arc event is occurring from the arc fault input and can send an output signal to a ground fault signal conditioning circuit 2880, and then through a large signal event control circuit 2700 or a level and timing control circuit 2800 if arcing has been confirmed. A tripping signal can be sent to a tripping control circuit 2940. Tripping control circuit 2940 can be adjusted by parameter settings obtained via, for example, P10, P11, and/or P13. Tripping control circuit 2940 can be affected by signals derived from temperature sensor 2600. Performance of ASIC 2000 can be tested and/or verified by an input signal sent from PTT signal generator 2840.

Large signal event control circuit 2700 can comprise a time duration check. In certain embodiments, large signal event control circuit 2700 can be used to monitor if any fault level is exceeds a predetermined threshold. If a fault level exceeds the predetermined threshold, ASIC 2000 can be configured to determine whether a time duration of the fault is below a predetermined duration. ASIC 2000 can be configured to avoid sending a signal to trip an electrical device if the time duration of the fault is below the predetermined duration, which can reduce a probability of an unnecessary or nuisance trip. Otherwise, a true fault signal with an extraordinary level can result in a relatively rapid trip of a circuit interrupting device via a signal provided by tripping control circuit 2940. For example, large signal event control circuit 2700 can be configured to react rapidly to a strong arc fault and/or a ground fault.

Level and timing control circuit 2800 can process a fault signal characterized by an amplitude that is not high enough for processing by large signal event control circuit 2700. The fault signal can indicate a fault condition that can be present for a predetermined amount of time. The amount of time to generate a tripping signal for a higher level event can be shorter and for a lower level event can be longer. The timing can be adjusted by an input obtained via, for example, P7. Level and timing control circuit 2800 can be configured to avoid nuisance trips caused by noise in a received signal from a connected electrical circuit. Level and timing control circuit 2800 can be configured to compare an amplitude of a received signal to a predetermined amplitude threshold. Level and timing control circuit 2800 can be configured to compare a duration of the received signal to a second predetermined duration threshold.

Tripping control circuit 2940 can be an interface circuit for control of a silicon-controlled rectifier (SCR). ASIC 2000 can comprise a power up reset circuit 2900, which can be configured to avoid nuisance trips during a short period time during which ASIC 2000 and/or a system related thereto is powered up. The short period of time can be set by parameters provided via, for example, pin P6.

Figure 3:
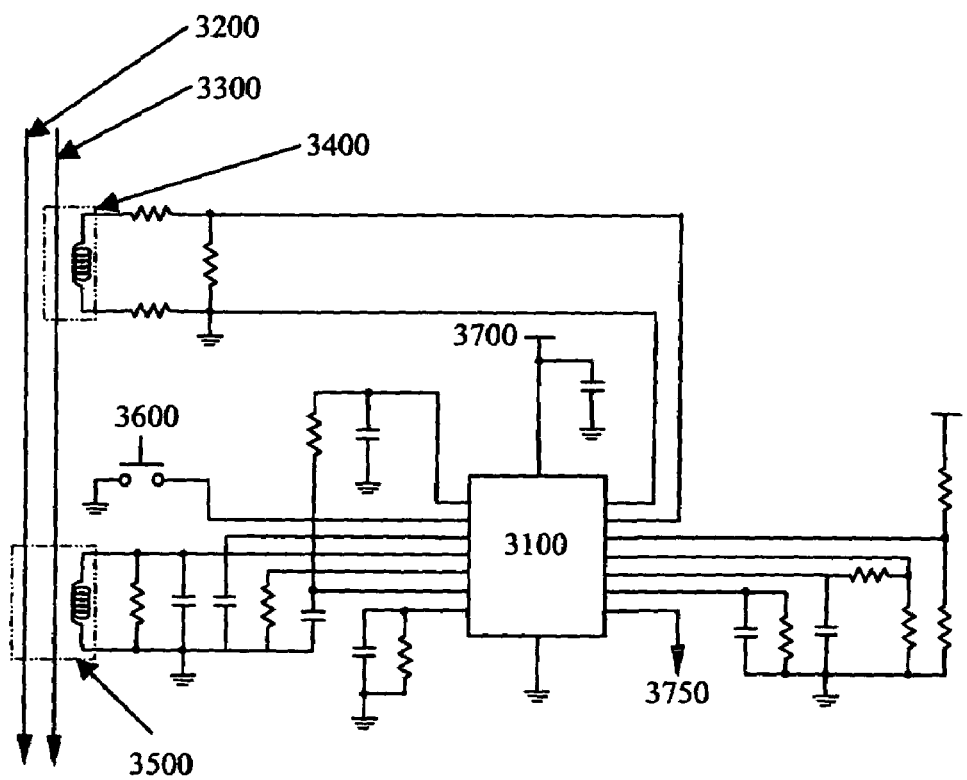
FIG. 3 is a block diagram of an exemplary embodiment of a system 3000.

FIG. 3 is a block diagram of an exemplary embodiment of a system 3000, which can be comprise an ASIC 3100, which can be similar to ASIC 2000 of FIG. 2. All resistors or capacitors comprised in system 3000 can be used for matching impendence, setting system parameters, or filtering noise. System 3000 can comprise a line conductor 3200 and a neutral conductor 3300. An electrical current flowing via neutral conductor 3300 can be measured via a current sensor 3400. A differential current sensor 3500 can monitor a differential current between line conductor 3200 and neutral conductor 3300. System 3000 can comprise a push to test button 3600, which can provide a signal to ASIC 3100 indicative of a request to test one or more components comprised in system 3000. A power source 3700 can supply electrical energy to ASIC 3100. An output 3750 from ASIC 3100 can be provided to a SCR for control purposes.

Figure 4:
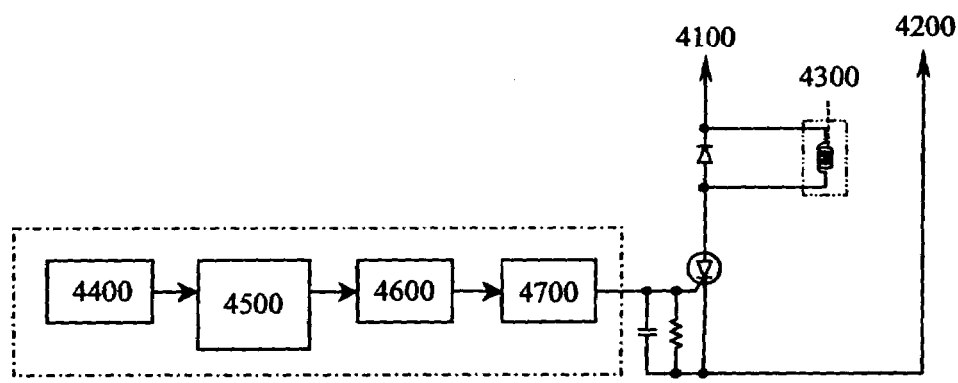
FIG. 4 is a block diagram of an exemplary embodiment of a system 4000.

FIG. 4 is a block diagram of an exemplary embodiment of a system 4000. System 4000 can comprise an arc verifier 4400, a ground fault detector 4500, a level check 4600 and/or an SCR buffer 4700. In certain exemplary embodiments, arc verifier 4400, a ground fault detector 4500, a level check 4600 and/or an SCR buffer 4700 can be comprised in an ASIC, such as ASIC 2000 of FIG. 2.

Figure 5:
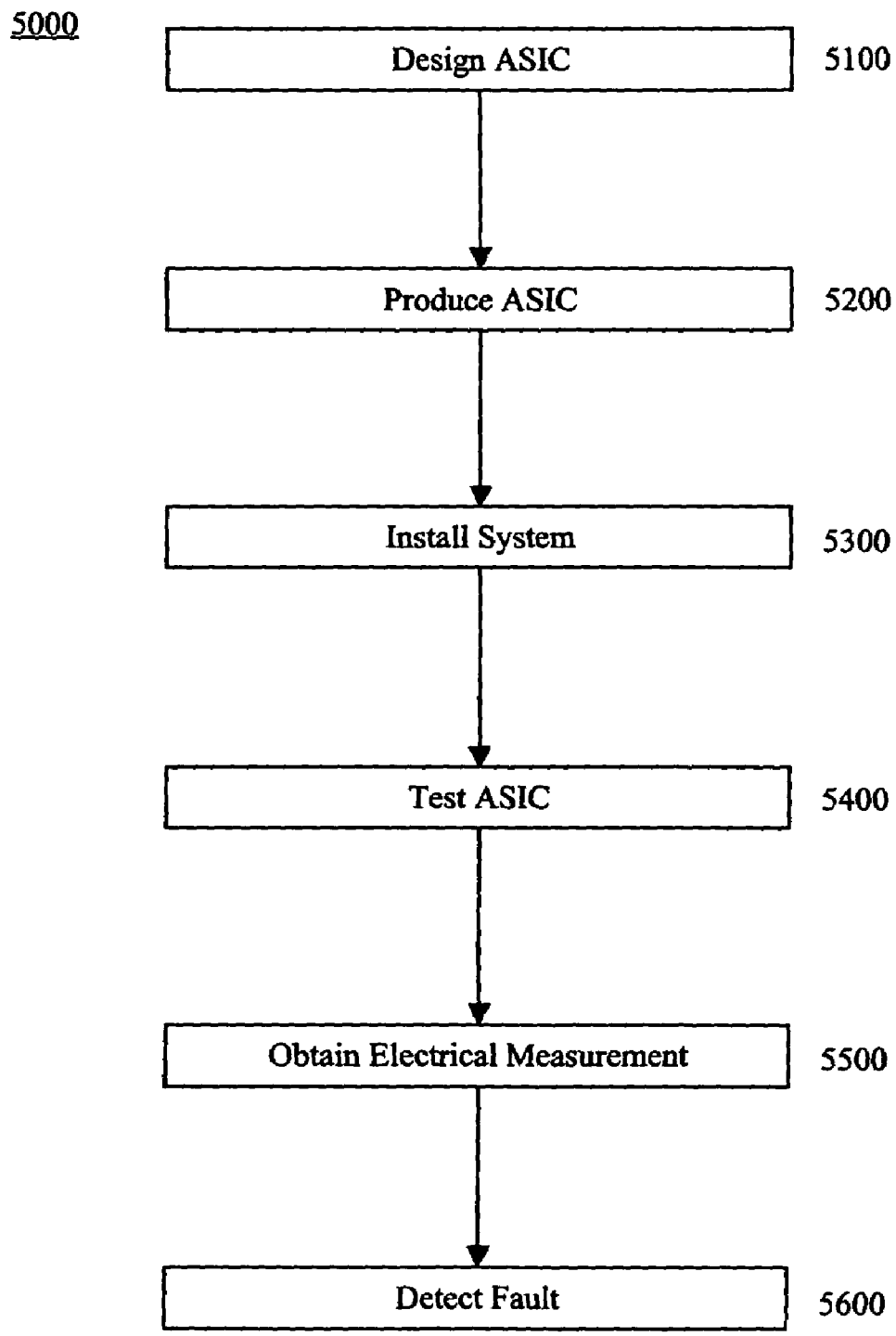
FIG. 5 is a flowchart of an exemplary embodiment of a method 5000.

FIG. 5 is a flowchart of an exemplary embodiment of a method 5000. At activity 5100, an ASIC can be designed. For example, the ASIC can be designed to provide an output signal configured to trip a device in an electrical circuit responsive to a detected fault. The ASIC can be designed to comprise an on-chip linear temperature sensor. The ASIC can be designed and/or configured to correct at least one measured electrical value responsive to a temperature measured by the on-chip linear temperature sensor. The ASIC can comprise a level and timing control circuit configured to avoid nuisance trips due to noise in a received signal from the electrical circuit. The level and timing control circuit can be configured to compare an amplitude of the received signal to a predetermined amplitude threshold. The level and timing control circuit can be designed and/or configured to compare a duration of the received signal to a predetermined time threshold. The ASIC can be designed to comprise one or more circuits configured to provide an analog to digital conversion of one or more input signals. For example, the ASIC can be configured to receive an input signal from a current sensor in an analog form. The ASIC can comprise a circuit to convert the input signal to a digital representation thereof.

At activity 5200, the ASIC can be produced. The ASIC can be produced utilizing any manufacturing method. The ASIC can be produced via a method that creates photo masks for photolithography. ASIC production can comprise wet and/or dry etching, plasma ashing, thermal treatment, chemical vapor deposition, physical vapor deposition, molecular beam epitaxy, electroplating, chemical mechanical polishing, wafer testing, wafer backgrinding, die cutting, integrated circuit bonding, integrated circuit encapsulation, and/or any other process known to those skilled in the art, etc.

At activity 5300, the ASIC can be installed as a portion of an arc fault and/or ground fault protection system. The system can comprise an electrical circuit with a connected load. The system can comprise a current monitor configured to measure an electrical current on a neutral conductor. The system can comprise a differential current monitor configured to measure a differential current between a line conductor and the neutral conductor. This system can comprise the ASIC, which can be electrically coupled to a trip mechanism configured to trip a device to stop a flow of electricity in the electrical circuit responsive to a detected arc fault and/or ground fault.

At activity 5400, the ASIC can be tested. The ASIC can be tested for arc fault performance via an automatically generated waveform. The automatically generated waveform can be generated to verify proper performance of one or more devices comprised in the system responsive to a detected arc fault. In certain exemplary embodiments, the ASIC can be tested for proper performance responsive to a ground fault. A signal indicative of a ground fault can be simulated by and/or provided to the ASIC to test proper performance responsive to a ground fault. The ASIC can provide an output signal to one or more electrical devices configured to stop an electrical current flow in a connected electrical circuit.

At activity 5500, an electrical measurement can be obtained. For example, a neutral conductor current measurement and/or a differential current measurement between the line conductor and the neutral conductor can be obtained.

At activity 5600, a fault can be detected in an electrical circuit based upon the electrical measurement via the ASIC. The ASIC can respond to the detected fault at a rate commensurate with a risk associated with the level and duration of the fault. Responsive to the detected fault, the ASIC can provide a signal requesting that a flow of electricity stop in the electrical circuit. Responsive to the signal the device can be tripped and the electrical circuit can be deenergized.

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless-clearly specified to the contrary, such as via an explicit definition, assertion, or argument, with respect to any claim, whether of this application and/or any claim of any application claiming priority hereto, and whether originally presented or otherwise:

- there is no requirement for the inclusion of any particular described or illustrated characteristic, function, activity, or element, any particular sequence of activities, or any particular interrelationship of elements;
- any elements can be integrated, segregated, and/or duplicated;
- any activity can be repeated, performed by multiple entities, and/or performed in multiple jurisdictions; and
- any activity or element can be specifically excluded, the sequence of activities can vary, and/or the interrelationship of elements can vary.

Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A system comprising:
an application specific integrated circuit configured to provide an output signal, said output signal configured to trip a device in an electrical circuit responsive to a detected fault, said application specific integrated circuit comprising:
an on-chip linear temperature sensor, said application specific integrated circuit configured to correct at least one measured electrical value responsive to a temperature measured by said on-chip linear temperature sensor; and
a level and timing control circuit configured to avoid nuisance trips caused by noise in a received signal from said electrical circuit, said level and timing control circuit configured to compare an amplitude of said received signal to a first predetermined threshold, said level and timing control circuit configured to compare a duration of said received signal to a second predetermined threshold.

2. The system of claim 1, said application specific integrated circuit further comprising:
a power up reset circuit configured to avoid nuisance trips during a system power up.

3. The system of claim 1, said application specific integrated circuit further comprising:
a simulation circuit configured to simulate a signal indicative of an arc fault to an input of said application specific integrated circuit, said input generated responsive to an action of a user.

4. The system of claim 1, said application specific integrated circuit further comprising:
an oscillator circuit configured to control a simulated waveform frequency of a simulation circuit.

5. The system of claim 1, said application specific integrated circuit further comprising:
a circuit configured to receive an input for a ground fault.

6. The system of claim 1, said application specific integrated circuit further comprising:
a circuit configured to control a gain of a circuit configured to receive a ground fault input signal.

7. The system of claim 1, said application specific integrated circuit further comprising:
a circuit configured to control a time delay associated with a ground fault input signal.

8. The system of claim 1, said application specific integrated circuit further comprising:
a circuit configured to control a status of a silicon-controlled rectifier.

9. The system of claim 1, said application specific integrated circuit further comprising:
a circuit configured to control an arc fault integration.

10. The system of claim 1, said application specific integrated circuit further comprising:
a circuit configured to phase-shift an arc fault signal.

11. The system of claim 1, said application specific integrated circuit further comprising:
a circuit configured to control a gain of a circuit configured to receive an input for an arc fault.

12. The system of claim 1, said application specific integrated circuit further comprising:
a circuit configured to control an arc fault signal amplitude.

13. The system of claim 1, said application specific integrated circuit further comprising:
a circuit configured to receive an input from a neutral line current sensor.

14. The system of claim 1, said application specific integrated circuit further comprising:
a circuit configured to receive an arc fault input signal.

15. The system of claim 1, said application specific integrated circuit further comprising:
a control circuit configured to react rapidly to a strong arc fault.

16. The system of claim 1, said application specific integrated circuit further comprising:
a control circuit configured to react rapidly to a ground fault.

17. The system of claim 1, said application specific integrated circuit further comprising:
a voltage regulator configured to provide a voltage output from said application specific integrated circuit.

18. The system of claim 1, further comprising:
a power supply.

19. The system of claim 1, further comprising:
a mechanism configured to trip said device in said electrical circuit.

20. The system of claim 1, further comprising:
a sensor configured to measure a neutral current in said electrical circuit.

21. The system of claim 1, further comprising:
a sensor configured to measure a differential current in said electrical circuit.

22. A method comprising:
producing an application specific integrated circuit configured to provide an output signal, said output signal configured to trip a device in an electrical circuit responsive to a detected fault, said application specific integrated circuit comprising:
an on-chip linear temperature sensor, said application specific integrated circuit configured to correct at least one measured electrical value responsive to a temperature measured by said on-chip linear temperature sensor; and
a level and timing control circuit configured to avoid nuisance trips due to noise in a received signal from said electrical circuit, said level and timing control circuit configured to compare an amplitude of said received signal to a first predetermined threshold, said level and timing control circuit configured to compare a duration of said received signal to a second predetermined threshold.

23. An application specific integrated circuit comprising:
an output circuit configured to provide an output signal, said output signal configured to trip a device in an electrical circuit responsive to a detected fault;
an on-chip linear temperature sensor, said application specific integrated circuit configured to correct at least one measured electrical value responsive to a temperature measured by said on-chip linear temperature sensor; and
a level and timing control circuit configured to avoid nuisance trips caused by noise in a received signal from said electrical circuit, said level and timing control circuit configured to compare an amplitude of said received signal to a first predetermined threshold, said level and timing control circuit configured to compare a duration of said received signal to a second predetermined threshold.

* * * * *